UNITED STATES PATENT OFFICE.

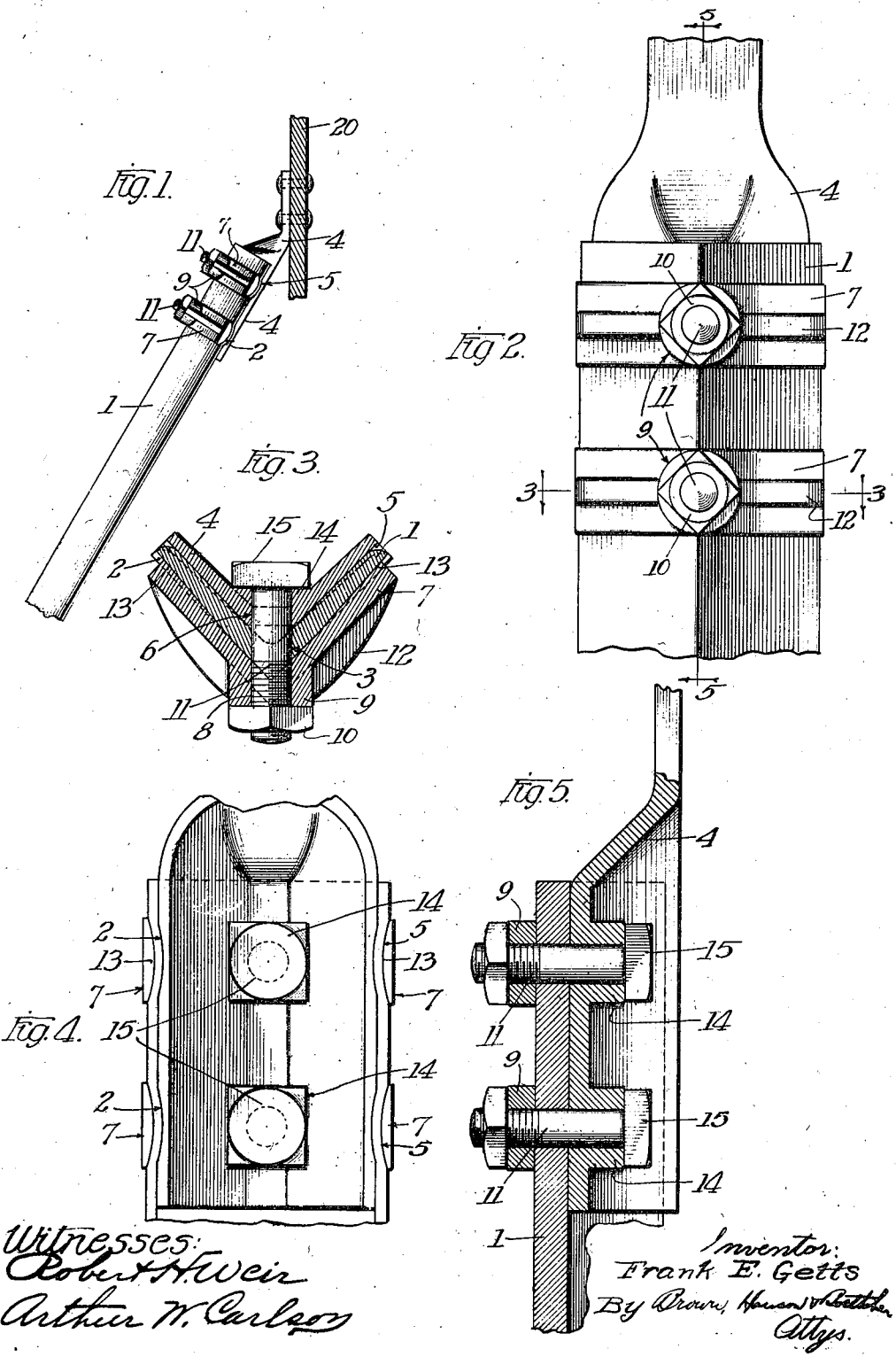

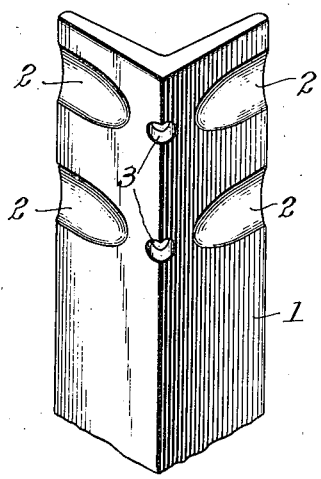
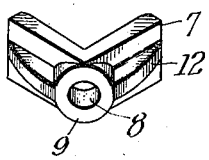
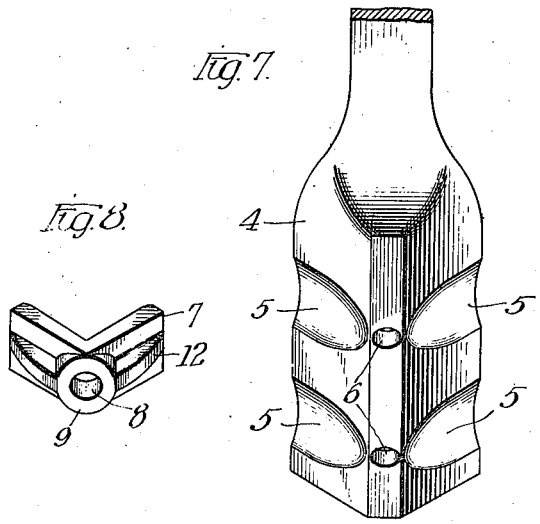
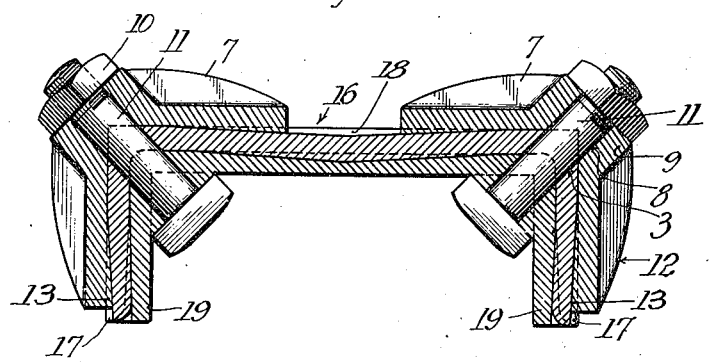
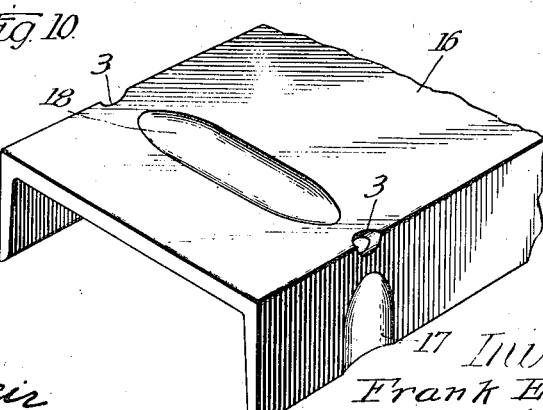

FRANK E. GETTS, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

JOINING MEANS FOR ANGLES, CHANNELS, AND THE LIKE.

1,199,778.                    Specification of Letters Patent.         Patented Oct. 3, 1916.

Application filed July 2, 1915. Serial No. 37,656.

*To all whom it may concern:*

Be it known that I, FRANK E. GETTS, a citizen of the United States, residing at Chicago, in the county of Cook and State of Illinois, have invented a certain new and useful Improvement in Joining Means for Angles, Channels, and the like.

This invention relates to joining-means for angles, channels and the like.

Heretofore in the art very considerable difficulty has been experienced in joining structural-shaped bars. This has been particularly troublesome in field assembly of parts of transmission towers, windmill towers and similar structures which are shipped in parts or sections and must be assembled in the field with as few and as simple tools and equipment as possible.

The practice of bolting angles, channels and similar structural parts together has been found unsatisfactory because of the small strength of such joints. It is impossible to draw the parts closely enough together to obtain proper surface friction without using so many bolts as to make the cost prohibitive and the structure impractical. The time required for fastening bolts is in excess of the time required to fasten an equal number of rivets, and the cost is generally more. However, riveting together of parts in the field is often impractical and is at times undesirable, because it may be found necessary to separate the parts.

The object of my invention is to provide improved joining-means for angles, channels and the like, which I shall term structural angle-bars, to allow of joining the said structural angle-bars to each other or to other parts with a minimum of effort and time.

A further object is to provide a joint which may be easily assembled or disassembled and which will employ a minimum of material to maximum advantage.

In structures employing my invention the surface contact between the bar and the gusset is augmented and supplemented by offsets in the flanges in the structural bar and in the gusset seats, which are locked together by angle-clips and held by bolts.

I place the fastening bolts under tension and depend upon the shearing strength of the projections instead of the shearing strength of the bolts, to hold the parts together.

I shall now describe, with the aid of the accompanying drawings, which illustrate a preferred embodiment of my invention, a particular manner in which the invention may be practised.

Figure 1 illustrates a joint made between a plate and an angle, employing my invention. Fig. 2 illustrates a plan view of the saddle-clips, the end of the angle and the extending end of the gusset. Fig. 3 is a cross-section taken on the line 3—3 of Fig. 2. Fig. 4 is a bottom plan view showing the inside of the gusset and the heads of the fastening bolts seated in their sockets. Fig. 5 is a longitudinal section taken on the line 5—5 of Fig. 2. Fig. 6 is a perspective view of an angle-bar punched and stamped to form a joint. Fig. 7 is a perspective view of the coöperating gusset-plates. Fig. 8 is a perspective view of the saddle-clips. Fig. 9 is a cross-sectional view illustrating the manner in which the invention may be applied in joining a gusset and a channel-bar; and Fig. 10 is a perspective view of the end of a channel-bar punched and stamped to form a joint such as shown in Fig. 9.

In Fig. 6 I have shown the end of an angle-bar 1 having offsets 2 stamped in the side or flange of the bar to form the depressions on the outside and projections on the inside, as may be seen more clearly in Fig. 3. Suitable holes 3 are punched, drilled or otherwise formed in the corner of the angle-bar in line with a pair of projections 2. The gusset 4 shown in Fig. 7 lies inside of the corner of the angle-bar 1 and is formed with notches or depressions 5 which register with the offsets 2 in the angle-bar 1. Suitable bolt-holes 6 are provided in the center of the gusset, these holes registering with the holes 3 in the angle-bar. The gusset 4 may be formed of malleable castings of plain cast iron, forgings, or the like, and may be made in any shape desirable to join the structural angle-bar to any other part.

Angle-clips 7 (see Fig. 8) are seated or saddled upon the corner of the angle-bar in line with the depressions 2. These saddle-clips are provided with bolt-holes 8 which register with the holes 3 and 6 in the angle-bar and in the gusset, respectively. A suitable boss 9 is formed about the hole 8 to form a seat for the nut 10 of the bolt 11. The boss 9 may be connected to the sides of the clips by means of the strengthening webs or flanges 12. The inside surface of the saddle-clips is provided with beads 13 which seat in the depressions 2 and serve to hold the depressions in the notches 5 in the gusset-plate.

The gusset-plate 4 is provided with bosses 14 of a size suitable to receive the head 15 of the clamping-bolt 11 and at the same time prevent the head of the bolt from turning.

Fig. 3 shows, in a cross-sectional view, disposition of the parts when the clamping-bolt 11 is drawn up. Although the bolt 11 passes diagonally through the surfaces to be clamped, it is not placed under uneven strain, due to the seats provided for it. The diagonal stresses upon the clamping surfaces are a distinct advantage and tend to keep the parts tight at all times.

The gusset-plate 4 may be made in any convenient shape for joining an angle-bar to any desired part. Where a number of angle-bars are to be secured together, a suitable casting or stamping may be employed and very little trouble in assembling or disassembling the parts is experienced. The structural bar is not weakened to any appreciable extent by the depressions 2, as these parts are merely offsets and are not any appreciable diminution in the thickness of the material. It is to be noted that the interior surface of the gusset-plate and of the angle-clips is preferably relieved to prevent binding at the corner and to secure a good gripping action.

In Figs. 9 and 10 I have illustrated the manner in which my invention may be applied to joining channel-bars or beams to other parts. In this case the channel-beam 16 is provided with the holes 3 running diagonally through the corner and with the depressions 17 in the sides of the channel, and a large depression 18 in the web thereof. Saddle-clips 7 are employed upon the outside of the channel-beam and the beads 13 thereof seat in the depressions 17 and 18. The gusset 19 is formed to coöperate with the channel 16 and has depressions registering with the depressions 17 and 18 and is provided with suitable bolt-holes running diagonally through the corner to allow the bolt 11 to pass therethrough. These bolts grip the channel between the gusset and the saddle-clips in a manner similar to the function they perform in joining the V-shaped angle-bar to its coöperating gusset.

The same size angle or saddle-clips 7 which serve to join one size of V-shaped angle-bar, may be employed to join a corresponding sized channel-bar to the respective gusset-plates. It is obvious that different size parts will be employed with different standard sizes of bars.

I do not desire to be confined to the precise details of construction shown and described, but intend that my invention shall extend to such variations and modifications as may suggest themselves to one skilled in the art.

What I claim as new and desire to protect by Letters Patent of the United States is the following:

1. In combination, a structural angle-bar, a gusset, said angle-bar having offset depressions in the flanges thereof, coöperating seats on said gusset, a saddle-clip seated on said angle and serving to press said offset parts together, and a bolt passing through the center of said saddle-clip and through said angle-bar and gusset.

2. In combination, a V-shaped angle-bar, a coöperating gusset conforming to the interior surface of said angle-bar, a saddle-clip seated on the outer surface of said angle-bar, said parts having registering offsets to prevent endwise motion of the parts, and a bolt passing diagonally through the corner for clamping said parts together.

3. In combination, a V-shaped angle-bar, a gusset conforming to the interior surface thereof, a saddle-clip conforming to the outer surface of said angle-bar, said parts having laterally-offset portions to prevent endwise motion, and having a bolt-hole through the corner of said parts, a boss on said gusset and a boss on said saddle-clip, and a bolt passing through said parts and coöperating with said bosses.

4. In combination, a structural bar having an angle therein, lateral offset portions disposed on each side of said angle, a gusset fitting on the inside surface of said bar, a saddle-clip fitting on the outside surface of said bar, said parts having lateral offset portions coöperating with the offset portions of said bar, and a bolt for clamping said parts together.

5. In combination a structural wrought metal angle bar having a convex side and a concave side, a gusset nesting into said concave side and a bolt passing centrally through said gusset and said angle bar for clamping the gusset and the bar together into closer nesting relation, there being transverse projections and depressions on said gusset and said bar on each side of said bolt and each leg of the angle for preventing relative longitudinal movement between the gusset and the bar.

6. In combination, a structural wrought metal bar having an angle therein, laterally offset portions disposed on each side of the angle, an angular gusset adapted to nest with said bar, said gusset having laterally offset portions adapted to nest with the offset portions of said bar and bolts passing centrally through said gusset and said bar for wedging said gusset and bar together in nested relation.

In witness whereof, I hereunto subscribe my name this 29th day of June A. D. 1915.

FRANK E. GETTS.